United States Patent Office 3,269,934
Patented August 30, 1966

3,269,934
HYDROCRACKING PROCESS WITH THE USE OF A Y TYPE CRYSTALLINE ZEOLITE AND A NITROGEN CONTAINING HYDROCARBON OIL
Rowland C. Hansford, Yorba Linda, Calif., assignor to Union Oil Company of California, Los Angeles, Calif., a corporation of California
No Drawing. Filed Dec. 24, 1963, Ser. No. 333,188
8 Claims. (Cl. 208—111)

(This application is a continuation-in-part of application Serial No. 150,129, filed November 6, 1961, which in turn is a continuation-in-part of application Serial No. 72,325, filed November 29, 1960, and now abandoned.)

This invention relates to the catalytic hydrocracking of hydrocarbons, especially high-boiling mineral oil fractions, to produce lower boiling fractions such as gasoline or jet fuel. The principal novel feature of the process resides in the use therein of special catalysts comprising a certain type of crystalline, zeolitic molecular sieve cracking base upon which is deposited a minor proportion of a transitional metal hydrogenating promoter. More specifically, the molecular sieve cracking base is a hydrogen, or "decationized," form of a special class of zeolitic alumino-silicates characterized by (1) a relatively uniform crystal pore diameter of between about 6 and 14 A., preferably 9 to 10 A. and (2) a silica/alumina mole-ratio greater than 3, and preferably between about 3 and 6. The hydrogenating promoter may comprise any one or more of the transitional metals, their oxides or sulfides, and particularly the metals of Group VIB and Group VIII, and their oxides and sulfides.

The combination of the zeolitic cracking base and the hydrogenating promoter may be pelleted and employed as such, but it is found preferable to admix and copellet the micro-crystalline catalyst with a relatively inert, powdered, refractory adjuvant material having an average particle size substantially larger than the average size of the molecular sieve crystals. When properly copelleted, the catalysts containing the adjuvant are found to display a higher effective activity than an equal volume of the pelleted metal-zeolite component alone.

The catalysts of this invention are found to be considerably more active than conventional hydrocracking catalysts wherein the molecular sieve component is replaced by an ordinary amorphous silica-alumina, gel-type cracking base. This superior activity is particularly pronounced in respect to the hydrocracking of feedstocks containing organic nitrogen in amounts of 1–100 p.p.m. or more, even when such organic nitrogen is in the form of refractory, high-molecular-weight heterocyclic nitrogen compounds. Moreover, the catalysts appear to be much more selective in their activity, in that they induce very little coke and methane formation. As a result of the reduced coke formation, they are found to maintain their activity for long periods of time between regenerations.

A most surprising feature of the invention resides in the extremely high iso/normal paraffin ratios found in the hydrocracked $C_4$–$C_6$ product fractions. The catalysts of this invention possess excellent intrinsic isomerization activity for lower paraffins. It hence came as a distinct surprise to find that, in the presence of hydrocracking feeds, the isomerization activity was so inhibited that far higher than the thermodynamic equilibrium ratios of iso/normal paraffins were obtained.

An important feature of the process resides in the use of hydrocracking temperatures considerably lower than conventional, e.g., between about 450° and 800° F., and preferably between about 500° and 750° F. The efficacy of low temperatures in the process of this invention stems from the improved activity of the catalyst, and the selectivity of conversion is a concomitant result of the low temperatures used and the intrinsic selectivity of the catalyst. Further, even at the low temperatures employed, it is found that a high degree of conversion per pass may be maintained at relatively high space velocities of, e.g., 1–5. This is a very important item from an economic standpoint, for it means that reactor volume and catalyst inventory can be greatly reduced for any given feed throughput and conversion requirement.

It is a principal object of this invention to provide more efficient and selective hydrocracking catalysts which will effect a maximum conversion of the feed to gasoline-boiling-range hydrocarbons, and a minimum of destructive degradation to products such as methane and coke. Another object is to provide catalysts which will maintain their activity for longer periods on-stream, between regenerations. A specific object is to provide a hydrocracking process which may be conducted under relatively low hydrogen pressures, thereby minimizing utility and plant construction costs, and also minimizing the danger of explosive runaway reactions. Another object is to provide catalysts which are effective for the hydrocracking of refractory stocks such as nitrogen-containing cycle oils from conventional catalytic or thermal cracking operations. Still another object is to provide catalysts which are active at low temperatures, thereby further minimizing the formation of coke, and extending the run length between regenerations. Other objects will be apparent from the more detailed description which follows.

Hydrocracking processes as known in the art suffer from several serious disadvantages. In general, such processes are carried out at high temperatures, in excess of about 850° F. These temperatures tend to favor dehydrogenation and coking, and hence to obtain any substantial hydrogenating effect from the added hydrogen, and to reduce the coking rate, it is necessary to employ relatively high pressures of, e.g., 3,000 to 8,000 p.s.i.g. A catalyst active at low temperatures would hence be highly desirable both from the standpoint of reducing the rate of coke deposition, and permitting the use of low pressures.

The practical utility of the catalysts of this invention becomes most apparent in fixed-bed operations. A much sought after goal in these fixed-bed operations is to prolong the run length between catalyst regenerations. Where regeneration is required every few days, it is generally necessary to provide two reactors with double the amount of catalyst which is required for one reactor, so that one reactor will be on-stream while the other is being regenerated. Where the catalyst maintains its activity for several weeks it is generally more economical to shut the plant down for regeneration than to provide a stand-by reactor. But, in any case, each regeneration is an expensive operation, and results in some irreversible damage to the catalyst. Hence, to achieve maximum total catalyst life and to minimize operational expenses, it is mandatory to achieve the maximum run length between regenerations.

Since a fresh catalyst generally displays maximum activity, and since relatively constant conversion and throughput are desired in commercial operations, it is the normal practice to start a run at a relatively low temperature, and as the catalyst becomes less active, to raise the temperature periodically so as to maintain the desired conversion. This procedure is continued until a terminal temperature is reached at which the rate of catalyst deactivation becomes exponential as a result of the accelerated deposition of carbonaceous deposits. The range between the initial and terminal temperatures may be from about 25° to 300° F. or more. In hydrocracking operations conducted at below about 2,500 p.s.i.g., the terminal temperature for light stocks with an end-point of say 600° F., is ordinarily about 775° to 850° F.; for heavier stocks with an end-point of say 900° F., it is about 750° to 775° F.; and proportionately for other stocks depending on their end-boiling-points, nitrogen content and general refractoriness. It is thus evident that for a given set of conditions and feedstock, the run length will be determined by the permissible starting temperature.

It is contemplated herein to commence the hydrocracking runs at space velocities of about 0.7 to 6.0, and temperatures between about 450° and 600° F. to obtain 30 to 80% conversion to gasoline per pass, and continue to a terminal temperature of about 750° to 850° F., with at least half of the run being carried out at below about 750° F. Pressures between about 500 and 3,000 p.s.i.g. may be utilized, and run lengths of at least about six months are entirely feasible, and usually up to about one year or more. Such runs are generally not possible with conventional hydrocracking catalysts, except by resorting to uneconomically low space velocities in the range of about 0.1 to 0.5.

In the above or other types of hydrocracking operations, it is contemplated that the catalysts may be used under the following operating conditions:

|  | Operative | Preferred |
|---|---|---|
| Temperature, ° F | 450–850 | 600–750 |
| Pressure, p.s.i.g | 500–3,000 | 800–2,000 |
| LHSV | 0.7–6.0 | 1.0–5.0 |
| H₂/oil ratio, SCF/B | 1,000–20,000 | 3,000–15,000 |

The selection of specific operating conditions within the above ranges will depend upon many factors, principally the nature of the feedstock. In particular, the operating temperature for a given conversion is very sensitive to nitrogen content of the feed. Feeds containing less than about 1 p.p.m. of nitrogen can be hydrocracked in the low temperature ranges. For feeds richer in nitrogen, exemplary initial temperatures for obtaining about 50% conversion of a 750° F. end-point gas oil to 400° F. end-point gasoline per pass, at 1.5 LHSV and 1,500 p.s.i.g., are as follows:

| Feed nitrogen content, p.p.m. | Initial hydrocracking temp., ° F. |
|---|---|
| 1–10 | 520–580 |
| 10–50 | 580–680 |
| 50–2,000 | 680–720 |

An important feature to observe at this point is that, although higher temperatures are required for nitrogen-containing feeds, these temperatures are relatively stable, and the desired conversion can be maintained with very gradual temperature increases of, e.g., 0.01–2° F. per day until the 850° F. terminal temperature is reached. This is in sharp distinction to the temperature-increase requirements for conventional, amorphous silica-alumina hydrocracking catalysts; with these conventional catalysts, employed under the same conditions, steep, progressive temperature increases are required, even with feeds containing as little as 1 p.p.m. of nitrogen. A typical such operation using a 5 p.p.m.-nitrogen feed, may require temperature increases of 5–10° F. per day to maintain constant conversion, resulting in a run length of only about 1–2 months or less.

The hydrocracking feedstocks which may be treated herein include in general any mineral oil fraction boiling above the conventional gasoline range, i.e., above about 300° F. and usually above about 400° F., and having an end-boiling-point of up to about 1,000° F. This includes straight-run gas oils and heavy naphthas, coker distillate gas oils and heavy naphthas, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 800° F., having an API gravity of 20 to 35°, and containing at least about 30% by volume of acid-soluble components (aromatics+olefins). Organic nitrogen contents may range between about 1 and 2,000 p.p.m., preferably between about 5 and 100 p.p.m. Sulfur compounds may also be present.

The unique characteristics of the catalysts of this invention, including the improved activity and selectivity, are believed to stem principally from the physical and/or chemical properties of the silica-rich, zeolitic molecular sieve cracking bases in their "decationized," or hydrogen form. These crystalline zeolites are composed mainly of silica and alumina, the $SiO_2/Al_2O_3$ mole-ratio being at least 3, and preferably between about 3 and 6. They display relatively uniform crystal pore diameters between about 6 and 14 A., usuallyy 9–10A. They are to be distinguished from the "X" type molecular sieve zeolites (described for example in U.S. Patent No. 2,882,244), in that the X zeolites have a $SiO_2/Al_2O_3$ ratio of only about 2.5 and cannot be appreciably decationized without destroying their crystal structure.

Suitable synthetic zeolites for use herein are more particularly described in Belgian Patent No. 598,582, issued April 14, 1961. The preferred zeolite for use herein is designated as the "Y" crystal type in said patent, but the "L" crystal type described therein is also contemplated. Natural zeolites such as faujasite, erionite, mordenite and chabazite may also be employed.

In general, the Y zeolite in its sodium form can be prepared by heating an aqueous sodium alumino-silicate mixture at temperatures between about 25° and 125° C. (preferably 80–125° C.) until crystals are formed, and separating the crystals from the mother liquor. When a colloidal silica sol is employed as the source of silica, the aqueous sodium alumino-silicate mixture may have a composition as follows, expressed in terms of mole-ratios:

$Na_2O/SiO_2$ _____ 0.2–0.8
$SiO_2/Al_2O_3$ _____ 10–30
$H_2O/Na_2O$ _____ 25–60

When sodium silicate is used as the silica source, the optimum molar proportions are as follows:

$Na_2O/SiO_2$ _____ 0.6–2.0
$SiO_2/Al_2O_3$ _____ 10–30
$H_2O/Na_2O$ _____ 30–90

The resulting Y zeolites correspond to the general formula:

$$0.9 \pm 0.2\ Na_2O : Al_2O_3 : nSiO_2 : xH_2O$$

where $n$ is a number from 3 to about 6 and $x$ is any number up to about 10.

The "decationized," or hydrogen form of the Y zeolite may be prepared by ion-exchanging the alkali metal cations with ammonium ions, or other easily decomposable cations such as methyl substituted quaternary ammonium ions, and then heating to, e.g., 300°–400° C., to drive off ammonia, as is more particularly described in Belgian Patent No. 598,683. The degree of decationization, or hydrogen exchange, should be at least about 20%, and preferably at least about 40% of the maximum theoretically possible. The final composition should preferably contain less than about 6% by weight of $Na_2O$.

Originally, it was thought that a "decationized," (i.e., cation-deficient) zeolite was formed upon heating the ammonium zeolite, but the evidence presently available indicates that at least a substantial proportion of zeolitic hydrogen ions remain associated with the ion-exchange sites, and that little or no true "decationization" takes place. It will be understood however, that the term "hydrogen zeolite" as used herein is intended to designate the type of zeolite produced by thermal decomposition of the ammonium zeolite, irrespective of whether some degree of true "decationization" may take place.

Mixed, hydrogen-polyvalent metal forms of the Y zeolite are also contemplated. Generally such mixed forms are prepared by subjecting the ammonium zeolite to a partial back-exchange with divalent metal salt solutions. The resulting divalent metal-ammonium zeolite may then be heated at, e.g., 300–400° F. to prepare the divalent metal-hydrogen form. Here again, it is preferred that at least about 20% of the monovalent metal cations be replaced with hydrogen ions. It is further preferred that at least about 10% of the monovalent metal cations be replaced by divalent metal ions, e.g., magnesium, calcium, zinc or the like, for this is found to improve the hydrolytic stability of the resulting catalysts. A still further preference to be observed for maximum activity is that not more than about 20% of the original monovalent metal cations (3% by weight of $Na_2O$) shall remain in the catalyst.

The final hydrocracking catalyst is formed by adding a minor proportion, e.g., 0.1–20%, of one or more of the Group VIB and/or Group VIII metals, preferably a Group VIII noble metal. Specifically, it is preferred to employ about 0.1% to 3% by weight of palladium, platinum, rhodium, ruthenium or iridium. These Group VIII metals may be added by impregnation of the calcined hydrogen zeolite, but preferably they are added by ion-exchange during, or directly after the ammonium ion-exchange step, i.e., before the ammonium zeolite is decomposed to form the hydrogen zeolite.

To incorporate the Group VIII metals by ion exchange, the ammonium zeolite, still in a hydrous form, is digested with an aqueous solution of a suitable compound of the desired metal wherein the metal is present in a cationic form. Preferably, fairly dilute solutions of the Group VIII metal salts are employed, and it can be assumed that there will be a substantially quantitative exchange of ammonium ion for the Group VIII metal. The exchanged metal-ammonium zeolite is then filtered off, washed, dried and calcined in order to convert the ammonium ions to hydrogen ions. The resulting catalyst powders may then be pelleted in the usual manner.

Inasmuch as the zeolitic catalysts of this invention are usually in a micro-crystalline (cubic lattice) form, with a crystal size of about 1–5 microns, the pelleting or agglomeration of such crystals into large granules or pellets, tends to produce a relatively impervious structure, due to packing of the crystals. The result is that the exterior surface of the granules presents a relatively impervious barrier to the diffusion of gases, resulting in inefficient utilization of the active micro-pore sites located in the interior of the pellets. For this, and possibly other reasons, it has been found that improved activity is obtained by mixing the powdered catalyst with a relatively inert, powdered, refractory adjuvant material which acts inter alia as a spacer to separate the zeolite crystals, and provide relatively large pores leading into the interior of the catalyst granules. The average particle size of the adjuvant material is preferably greater than the crystal size of the zeolite. The mixture of powdered catalyst and adjuvant is then compressed into tablets or pellets, or may be moistened and pressed through a die to form a pelleted extrudate. The final composition may then be dried, calcined and, if desired, combusted to remove any lubricant or binder employed. Suitable refractory materials for use as catalyst adjuvants include in general the inorganic oxides, halides, sulfates, phosphates, sulfides, silicates, etc., which are stable at temperatures above about 900° F., and which are inert with respect to the zeolitic catalyst component. Compounds of monovalent metals, particularly alkali metals, are to be avoided, as are compounds which reduce to volatile metals or catalyst poisons such as $PH_3$ or $MoO_3$. Low melting compounds such as $V_2O_5$, $B_2O_3$, $ZnCl_2$ and the like, which may fuse or flux the zeolitic component, are also to be avoided. Amorphous, noncrystalline materials are preferred, though not essential.

Ordinarily, the adjuvant material is relatively inert (as to hydrocracking activity), as compared to the molecular sieve catalyst, but it is not intended to exclude the use of materials which in themselves exhibit some desirable catalytic activity. Preferably, the adjuvant is ground to a mesh size (Tyler) coarser than about 325, and finer than about 50 mesh, and is used in proportions ranging between about 10% and 80% by weight of the final catalyst composition, preferably between about 30% and 75%. Examples of suitable adjuvants are as follows:

| Oxides | Halides | Sulfates |
|---|---|---|
| Alumina (gamma, eta or kappa). | Magnesium fluoride. | Magnesium sulfate. |
| Silica gel. | Aluminum fluoride. | Calcium sulfate. |
| Magnesium oxide. | Calcium fluoride. | Strontium sulfate. |
| Titanium oxide. | Magnesium chloride. | Barium sulfate. |
| Chromium oxide. | Calcium chloride. | |
| Zinc oxide. | | |
| Rare earth oxides. | | |
| Beryllium oxide. | | |

| Phosphates | Sulfides | Silicates |
|---|---|---|
| Boron phosphate. | Iron sulfide. | Clays (Low $Na_2O$). |
| Magnesium pyrophosphate. | Cobalt sulfide. | Aluminum silicate. |
| Aluminum phosphate. | Nickel sulfide. | Magnesium silicate. |
| Calcium phosphate. | Manganous sulfide. | Calcium silicate. |
| Calcium pyrophosphate. | | |
| Zinc pyrophosphate. | | |
| Zirconium phosphate. | | |

In addition, many other materials, including charcoal, activated carbon and silicon carbide, may also be used.

In the pressure copelleting of the zeolitic catalyst powder with powdered adjuvant, it is important that the pressure be low enough to leave a substantial volume of interstitital pores or macro-pores having a diameter greater than about 20 A. Specifically, it is preferred that the final catalyst pellet comprise at least about 5% by volume of macro-pores in the 20–1,000 A. diameter range, as measured by the mercury porosimeter method described in Industrial and Engineering Chemistry, volume 41, page 780 (1949), or by the desorption isotherm method as described in the Journal of the American Chemical Society, volume 73, page 373 (1951). To achieve such a porous pellet, and at the same time obtain sufficient cohesion of the microparticles to produce a pellet having adequate mechanical strength, it has been found inadvisable to attempt to copellet the completely dry powders. The cohesive forces between the dry powder particles are so low that high compacting pressures are required, which tend to reduce the volume of macro-pores. However, if the moisture content of the zeolite (and preferably of the adjuvant material) is adjusted to within the 10–25% range (as measured by weight loss on ignition at temperatures of about 900° F.), it is found that pellets of adequate mechanical strength can be obtained at pelleting pressures low enough to leave at least about 5% by volume of macro-pores in the 20–1,000 A. diameter range.

Care must be exercised however in adjusting the moisture content of the zeolites. If the zeolite crystals have previously been dehydrated, a substantial loss in crystallinity may result upon rapid rehydration with liquid water. The desired water content is therefore achieved either by carefully controlling the initial dehydration of the ammonium zeolite, or by rehydrating at moderate temperatures of , e.g., 75° to 200° F. in the presence of water vapor at atmospheric pressure or below.

When the catalysts are produced by extrusion of wet, plastic mixtures of the powdered components, a water content greater than 25% is required for mechanical reasons. This water content can be achieved without destroying crystallinity, either by using the wet ammonium zeolite as recovered from the hydrogenating metal ion-exchange or impregnation step, or by careful low-pressure hydration with water vapor as described above, followed by the addition of liquid water.

In one modification of the invention, the powdered adjuvant material may be modified by the incorporation therein of a hydrogenating promoter, which may be the same as or different from the hydrogenating promoter used on the zeolitic component. This modification is particularly desirable in connection with the treatment of high-end-point, nitrogen-containing feedstocks boiling above about 650° F. and up to about 1,000° F. The heavy polycyclic hydrocarbons and nitrogen compounds in the high-end-point feedstocks tend to plug the pores of the zeolite crystals, but may be effectively hydrogenated and hydrocracked if desired, by contact with the active surface area of the adjuvant when modified by the incorporation of a hydrogenating promoter. This is feasible in view of the larger average pore diameter of the adjuvant material, which will ordinarily range between about 50 to 150 A. The hydrogenating promoter is preferably added to the adjuvant before incorporation of the zeolite component.

During usage, the accumulation of coke or other deactivating deposits will eventually cause undesirable decline in activity of the catalyst. When this occurs the catalyst may be regenerated to substantially the initial activity by controlled combustion to remove the inactivating deposits. Regeneration may be accomplished by heating at, e.g., 600° to 1,200° F. for 1 to 12 hours in the presence of air, or preferably air diluted with an inert gas such as flue gas.

The following examples are cited to illustrate the techniques and results obtainable by the process of this invention, but are not to be construed as limiting in scope:

Example I

A Pd-hydrogen-Y-molecular sieve catalyst was prepared by first converting a sodium Y-molecular sieve ($SiO_2/Al_2O_3$ mole-ratio=4.9) to the ammonium form by ion-exchange (90% replacement of Na ions by $NH_4$ ions), followed by the addition of 0.5 weight-percent of Pd by ion exchange, then draining, drying and calcining at 600–900° F. The resulting catalyst, in the form of 3/16″ x 1/8″ pellets, was then tested for hydrocracking activity, using as feed an unconverted cycle oil derived from a previous hydrofining-hydrocracking run. Its characteristics were as follows:

| | |
|---|---|
| Gravity, °API | 38.3 |
| Boiling range, Engler, °F. | 440–562 |
| Acid-soluble components, vol. percent | 18.5 |
| Sulfur, wt. percent added | 0.1 |
| Nitrogen, wt. percent | 0.0007 |
| Aniline point, °F. | 151.1 |

Prior to use in the hydrocracking test, the catalyst was reduced in hydrogen at 700° F. for 1 hour, and for 2 hours at 650° F. and 1,000 p.s.i.g. It was then sulfided with kerosene containing 10% sulfur (as thiophene) for 2 hours at 650° F., 1,000 p.s.i.g., 2 LHSV and with 10,000 s.c.f./b. of hydrogen. The temperature was then reduced to 600° F. and the test feed was substituted for the kerosene, the other conditions remaining the same for the hydrocracking run. Notwithstanding the high space velocity, low temperature and low pressure, the conversion to 400° F. end-point gasoline was 61.5% volume-percent of the feed. There was substantially no decline in activity over the 16 hour run, and visual inspection of the catalyst at the end of the run showed the substantial absence of coke.

In a run similar to the foregoing, the gasoline product was fractionated to separate the $C_4$, $C_5$ and $C_6$ fractions, which were then analyzed individually for iso/normal paraffin ratios. The results were as follows:

| Fraction: | Iso/normal ratio |
|---|---|
| $C_4$ | 2.4 |
| $C_5$ | 12.1 |
| $C_6$ | 15.0 |

It will be observed that these values are far higher than the thermodynamic equilibrium ratios.

Example II

About 43 parts by weight of the catalyst of Example I was ground to a 300-minus mesh powder, and copelleted with 57 parts by weight of 100–325 mesh activated alumina, the final pellets being 1/8″ in diameter. Upon testing this catalyst under the conditions of Example I, the conversion to 400° F. end-point gasoline was 81.4%, thus demonstrating that the use of a granular adjuvant gives even better results than the pure catalyst. It will be noted also that, on the basis of pure catalyst, the 81.4% conversion of this example was obtained at an effective space velocity more than twice that of Example I.

Example III

A sample of the copelleted catalyst of Example II was reduced in hydrogen at 900° F. to remove the sulfide sulfur, and was then tested for hydrocracking the feed of Example I, minus the added sulfur, the feed then containing less than 0.005% sulfur. Under the same hydrocracking conditions, the conversion to 400° F. end-point gasoline was 97.1%, thus demonstrating that the catalyst is even more active in unsulfided form than in the sulfided form. The 97.1% conversion at 600° F., and an effective space velocity of more than 4 (based on pure catalyst), indicates an activity greater than any other known hydrocracking catalyst.

Example IV

To demonstrate the stable activity of the catalysts of this invention in the presence of nitrogen compounds, an extended 40-day hydrocracking run was carried out, using as the initial feed a hydrofined gas oil characterized as follows:

| | |
|---|---|
| Boiling range, °F. | 384–860 |
| Gravity, °API | 34.7 |
| Sulfur, wt. percent | 0.38 |
| Nitrogen, p.p.m. | 5 |
| Aromatics, vol. percent | 30 |

The catalyst employed was a copelleted mixture of (A) 20 weight-percent alumina impregnated with 0.5% of palladium, and (B) 80 weight-percent of a 0.5% Pd-Y molecular sieve hydrocracking catalyst wherein about 50% of the ion-exchange capacity was satisfied by hydrogen ions, and about 40% by magnesium ions (3.6% by weight MgO). Hydrocracking conditions constant throughout the run were: pressure, 1,500 p.s.i.g.; LHSV, 1.5; $H_2$/oil ratio, 8,000 s.c.f./b. Temperature was adjusted during the run to maintain 60 volume-percent conversion per pass to 400° F. end-point gasoline. The significant results were as follows:

(1) After a four-day induction period, the daily temperature increase required to maintain the 60% conversion remained stable at about 1.8° F. for a period of 21 days, going from 540° to 577° F.

(2) At the end of the 25-day run, the feed was modified by adding thereto 1,700 p.p.m. of nitrogen in the form of tert-butylamine and 17 p.p.m. as quinaldine. An immediate temperature rise from 576° to 720° F. was required in order to maintain conversion, but after 6 days the temperature levelled out at about 735° F., and the temperature increase requirement thereafter was only about 01.–0.2° F. per day.

Example V

To demonstrate that the foregoing results are not obtainable with conventional hydrocracking catalysts, an additional 7-day run was carried out using the same initial feed as was employed in Example IV (5 p.p.m. nitrogen), and a coprecipitated silica-alumina (87% $SiO_2$–13% $Al_2O_3$) catalyst containing 0.5% of ion-exchanged palladium. Under the same conditions of pressure, hydrogen rates and feed rates, the 60% conversion could be maintained only by raising the temperature a constant 8.6° F. per day, from 595° to 655° F., over the 7-day run. No levelling out of the temperature-increase requirement was noted at the end of the run. It is evident therefore that run lengths of more than about 1–2 months are not obtainable when using nitrogen-containing feeds and conventional amorphous hydrocracking catalysts at space velocities greater than about 1.0.

Results analogous to those indicated in the foregoing examples are obtained when other hydrogenating promoters described herein are substituted for the palladium used on the Y sieve. It is hence not intended to limit the invention to the details of the examples, but only broadly as defined in the following claims.

I claim:
1. A process for the low-temperature catalytic hydrocracking of nitrogen-contaminated mineral oil feedstocks over long periods of time without catalyst regeneration, which comprises contacting a mixture of hydrogen and a mineral oil feedstock containing aromatic hydrocarbons and between about 1 and 2,000 parts per million of organic nitrogen with a fixed bed of granular hydrocracking catalyst comprising a minor proportion of a Group VIII metal hydrogenating component deposited upon a crystalline, zeolitic, alumino-silicate molecular sieve cracking base having a $SiO_2/Al_2O_3$ mole-ratio greater than about 3, a relatively uniform crystal pore diameter between about 6 and 14 A., and wherein at least about 20 percent of the ion-exchange capacity of said molecular sieve cracking base is satisfied by hydrogen ions; said contacting being initiated and continued without catalyst regeneration for a run length of at least about 3 months at temperatures between about 500° and 750° F., pressures between about 500 and 3,000 p.s.i.g., liquid hourly space velocities between about 0.7 and 6.0, and in the presence of between about 1,000 and 20,000 s.c.f. of hydrogen per barrel of feed, said conditions being further correlated so as to give between about 30 and 80 volume-percent conversion per pass to products boiling below the initial boiling point of the feedstock while periodically raising the hydrocracking temperatures to maintain the desired conversion level and compensate for catalyst deactivation, and terminating said hydrocracking run at a temperature below about 850° F.

2. A process as defined in claim 1 wherein the zeolitic cations of said molecular sieve cracking base comprise polyvalent metal ions equivalent to at least 10% of the ion-exchange capacity thereof.

3. A method as defined in claim 1 wherein said molecular sieve cracking base is of the Y crystal type, and wherein said hydrogenating component is a Group VIII noble metal incorporated by ion exchange into the crystal lattice of said cracking base.

4. A method as defined in claim 1 wherein said hydrogenating component is palladium.

5. A method as defined in claim 1 wherein said hydrocracking catalyst also comprises a relatively inert, powdered, refractory adjuvant material having an average particle size substantially greater than the average crystal size of said molecular sieve cracking base, said adjuvant being intimately commingled and consolidated in granular form with said cracking base.

6. A method as defined in claim 1 wherein said feedstock is a gas oil, and the lower boiling hydrocrarbons produced are in the gasoline and/or jet fuel boiling range.

7. A method as defined in claim 1 wherein said hydrocracking is initiated at a temperature between about 450° and 600° F., and is continued without catalyst regeneration for at least about six months while periodically raising the hydrocracking temperature an average of about 0.01–2° F. per day.

8. A method as defined in claim 7 wherein said feedstock contains between about 5 and 100 parts per million of organic nitrogen.

References Cited by the Examiner
UNITED STATES PATENTS

| | | | |
|---|---|---|---|
| 2,983,670 | 5/1961 | Seubold | 208—110 |
| 3,130,006 | 4/1964 | Rabo et al. | 23—110 |
| 3,140,249 | 7/1964 | Plank et al. | 208—120 |

DELBERT E. GANTZ, *Primary Examiner.*

A. RIMENS, *Assistant Examiner.*

UNITED STATES PATENT OFFICE
CERTIFICATE OF CORRECTION

Patent No. 3,269,934                                                         August 30, 1966

Rowland C. Hansford

It is hereby certified that error appears in the above numbered patent requiring correction and that the said Letters Patent should read as corrected below.

Column 3, in the table, last column, line 1 thereof, for "600-750" read -- 500-750 --; column 4, line 16, for "usuallyy" read -- usually --; column 6, in the second table, third column, after line 4, insert -- Titanium silicate, --.

Signed and sealed this 1st day of August 1967.

(SEAL)
Attest:

EDWARD M. FLETCHER, JR.                                      EDWARD J. BRENNER
Attesting Officer                                                                    Commissioner of Patents